(12) United States Patent
Gates

(10) Patent No.: US 10,126,741 B2
(45) Date of Patent: Nov. 13, 2018

(54) REMOTELY CONTROLLED POWER EQUIPMENT SYSTEM

(71) Applicant: Reuben B. Gates, Minot, ND (US)

(72) Inventor: Reuben B. Gates, Minot, ND (US)

(*) Notice: Subject to any disclaimer, the term of this patent is extended or adjusted under 35 U.S.C. 154(b) by 0 days.

(21) Appl. No.: 15/422,079

(22) Filed: Feb. 1, 2017

(65) Prior Publication Data

US 2018/0217587 A1   Aug. 2, 2018

(51) Int. Cl.
| | | |
|---|---|---|
| *B60K 1/02* | (2006.01) | |
| *G05D 1/00* | (2006.01) | |
| *G08C 17/02* | (2006.01) | |
| *A01D 34/00* | (2006.01) | |
| *E01H 5/09* | (2006.01) | |
| *B60L 11/18* | (2006.01) | |
| *B60K 25/00* | (2006.01) | |
| *A01G 20/30* | (2018.01) | |
| *A01D 101/00* | (2006.01) | |

(52) U.S. Cl.
CPC ......... *G05D 1/0022* (2013.01); *A01D 34/008* (2013.01); *A01G 20/30* (2018.02); *B60K 1/02* (2013.01); *B60K 25/00* (2013.01); *B60L 11/1851* (2013.01); *E01H 5/098* (2013.01); *G08C 17/02* (2013.01); *A01D 2101/00* (2013.01); *B60K 2025/005* (2013.01); *B60L 2200/40* (2013.01); *B60L 2240/42* (2013.01)

(58) Field of Classification Search
None
See application file for complete search history.

(56) References Cited

U.S. PATENT DOCUMENTS

| | | | |
|---|---|---|---|
| 4,318,266 A | 3/1982 | Taube | |
| 5,572,856 A | 11/1996 | Ku | |
| 6,061,617 A | 5/2000 | Berger | |
| 6,662,881 B2 | 12/2003 | Domann | |
| 8,024,995 B2 | 9/2011 | Dayton | |
| 8,151,410 B2* | 4/2012 | Batchelder | A01D 51/00 15/385 |
| 8,347,977 B2 | 1/2013 | Hendron | |
| 8,469,126 B2 | 6/2013 | Wuthrich | |
| 2007/0256846 A1 | 11/2007 | Gibbs | |
| 2008/0040007 A1 | 2/2008 | Bertsch | |
| 2010/0106344 A1 | 4/2010 | Edwards | |

(Continued)

*Primary Examiner* — James A Shriver, II
*Assistant Examiner* — Hilary L Johns
(74) *Attorney, Agent, or Firm* — Nustel Law Offices

(57) ABSTRACT

A remotely controlled power equipment system which allows various types of power equipment to be remotely controlled by a transmitter. The remotely controlled power equipment system generally includes a base which is adapted to removably connect to one of a plurality of attachments. The base includes a pair of wheels which are each individually powered by one of a pair of drive motors. A battery, which is charged by the primary motor via an alternator, is adapted to power the drive motors. The base includes a control unit which has a receiver adapted to receive commands from a transmitter and a controller adapted to individually control each of the drive motors in response to a signal received from the transmitter. In this manner, power equipment may be remotely controlled via a transmitter without the operator needing to manually operate the power equipment.

16 Claims, 15 Drawing Sheets

(56) References Cited

U.S. PATENT DOCUMENTS

2015/0007541 A1\* 1/2015 Albinger ................ A01D 69/02
                                                  56/10.2 A
2015/0234385 A1\* 8/2015 Sandin ................. G05D 1/0265
                                                  700/258

\* cited by examiner

REMOTELY CONTROLLED POWER EQUIPMENT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a remotely controlled power equipment system which allows various types of power equipment to be remotely controlled by a transmitter.

Related Art

Any discussion of the related art throughout the specification should in no way be considered as an admission that such related art is widely known or forms part of common general knowledge in the field.

Motor-driven tools and vehicles have been in use for many years to perform various functions such as yardwork, landscaping, road-clearing, lawn maintenance and the like. In recent years, certain devices have been released which allow a motor base which includes a motor to removably connect with any number of attachments.

Such devices generally include a motor base which includes a motor for operating any attachments which are removably connected to the motor base. Such attachments may include a lawnmower attachment, a snowblower attachment, a leafblower attachment, and the like. An exemplary type of such device includes the "Troy Bilt FLEX" system which includes numerous functional attachments which may be easily connected to or disconnected from a base which includes an engine for operating each of the attachments. However, to date, no such systems have included remote control functionality such that an operator may control the motor base and attachment from a remote location without manually operating the device.

SUMMARY

An example embodiment is directed to a remotely controlled power equipment system. The remotely controlled power equipment system includes a base which is adapted to removably connect to one of a plurality of attachments, such as by a connector. The base includes a pair of wheels which are each individually powered by one of a pair of drive motors. A battery, which is charged by the primary motor via an alternator, is adapted to power the drive motors. The base includes a control unit which has a receiver adapted to receive commands from a transmitter and a controller adapted to individually control each of the drive motors in response to a signal received from the transmitter. In this manner, power equipment may be remotely controlled via a transmitter without the operator needing to manually operate the power equipment.

There has thus been outlined, rather broadly, some of the embodiments of the remotely controlled power equipment system in order that the detailed description thereof may be better understood, and in order that the present contribution to the art may be better appreciated. There are additional embodiments of the remotely controlled power equipment system that will be described hereinafter and that will form the subject matter of the claims appended hereto. In this respect, before explaining at least one embodiment of the remotely controlled power equipment system in detail, it is to be understood that the remotely controlled power equipment system is not limited in its application to the details of construction or to the arrangements of the components set forth in the following description or illustrated in the drawings. The remotely controlled power equipment system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
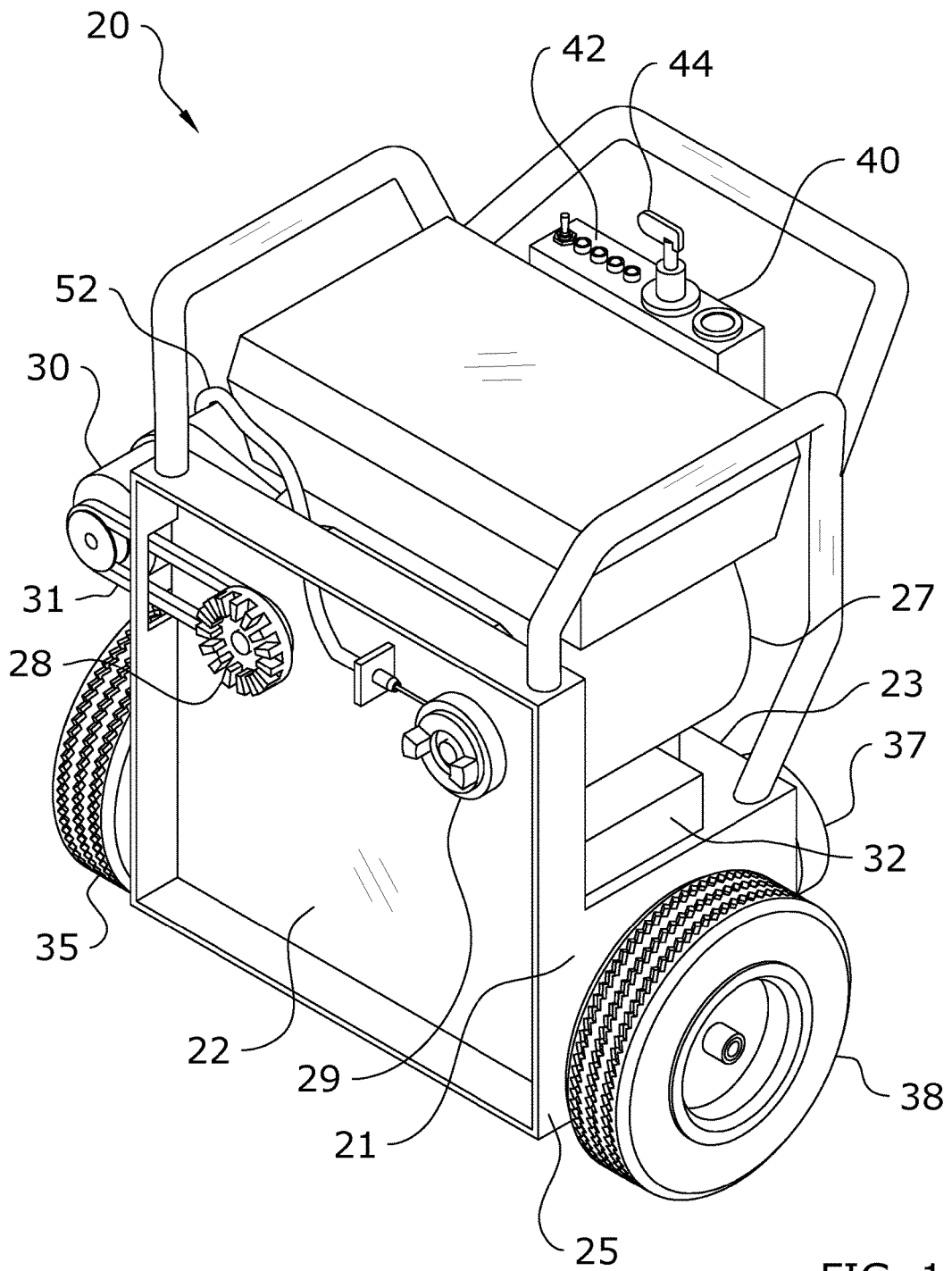
FIG. 1 is a frontal upper perspective view of a base in accordance with an example embodiment.

An example remotely controlled power equipment system generally comprises a base 20 which is adapted to removably connect to one of a plurality of attachments 70. The base 20 includes a pair of wheels 35, 38 which are each individually powered by one of a pair of drive motors 34, 37. A battery 32, which is charged by the primary motor 27 via an alternator 30, is adapted to power the drive motors 34, 37. The base 20 includes a control unit 40 which has a receiver 46 adapted to receive commands from a transmitter 60 and a controller 47 adapted to individually control each of the drive motors 34, 37 in response to a signal received from the transmitter 60. In this manner, power equipment may be remotely controlled via a transmitter 60 without the operator needing to manually operate the power equipment.

B. Motor Base

As best shown in FIGS. 1-10, a base 20 is provided which includes its own primary motor 27 adapted to operate any attachments 70 which are removably connected to the base 20. It should be appreciated that the structure, shape, size, configuration, and orientation of the base 20 will necessarily vary between different embodiments and for different functionalities.

The base 20 shown in the figures is merely exemplary and should not be construed as limiting with regard to its structure, size, shape, configuration, and/or orientation. Additionally as discussed in more detail below, the manner in which the base 20 receives and engages with attachments 70 may also vary and should not be construed as limited by the examples shown for illustrative purposes in the figures.

Figure 2:
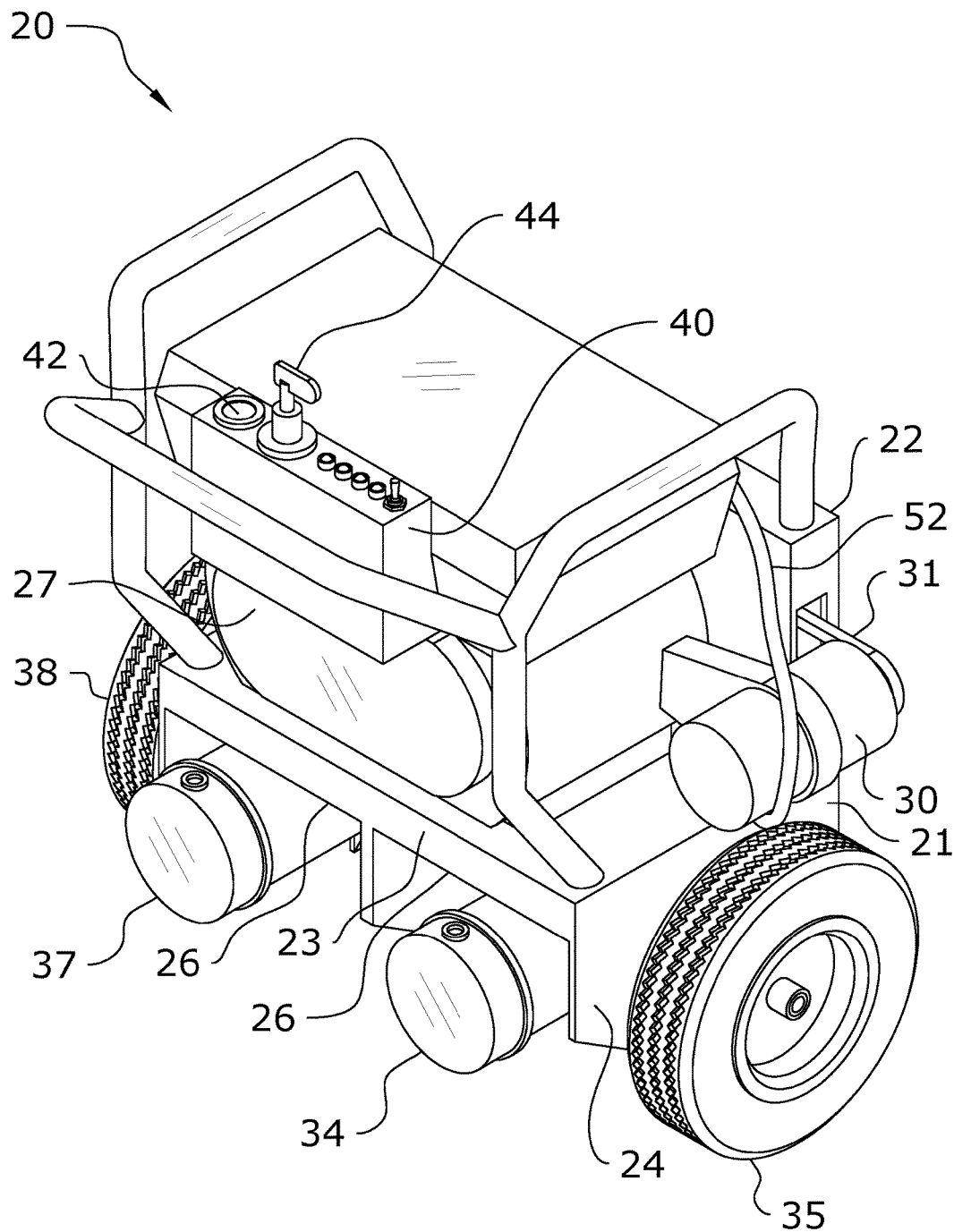
FIG. 2 is a rear upper perspective view of a base in accordance with an example embodiment.

As best shown in FIGS. 1 and 2, the base 20 includes a housing 21 which supports the various components of the present invention. The base 20 includes a front end 22, a rear end 23, a first side 24, and a second side 25. The front end 22 of the base 20 includes a primary drive unit 28 which is driven by the primary motor 27 of the base 20. The primary drive unit 28 is utilized to drive and operate the attachment 70 which is connected to the base 20. When in operation, the primary drive unit 28 is generally rotated by the primary motor 27 and is connected to the attachment 70 in a manner such that the rotation of the primary drive unit 28 is transferred to the attachment 70 to drive the attachment 70.

The front end of the base 20 may also include an engagement adapter 29 which is utilized to start and/or stop rotation of the attachment 70. The engagement adapter 29 is generally rotatable between multiple positions; with one position stopping rotation of the attachment 70 and another position starting and maintaining rotation of the attachment 70. By utilizing the engagement adapter 29, the attachment 70 may be started and/or quickly stopped from the base 20. The engagement adapter 29 may in some embodiments not be necessary, as the clutch mechanism to start and/or stop attachment 70 could be located entirely on base 20.

In the figures, the primary drive unit 28 is illustrated as being positioned on the front end 22 of the base 20 near its first side 24. The engagement adapter 29 is illustrated as being positioned on the front end 22 of the base 20 near its second side 25. It should be appreciated that the positioning of the primary drive unit 28 and the engagement adapter 29 on the base 20 may vary in different embodiments and should not be construed as limited by the exemplary figures.

As shown in FIG. 2, the rear end 23 of the base 20 may include a pair of wheel drive compartments 26 in which the drive motors 34, 37 are secured and positioned. Although the exemplary figures show a pair of wheel drive compartments 26, it should be appreciated that a single wheel drive compartment 26 may be utilized in some embodiments. Alternatively in some embodiments, a separate wheel drive compartment 26 may be omitted and the drive motors 34, 37 secured to other locations on the base 20.

Figure 3:
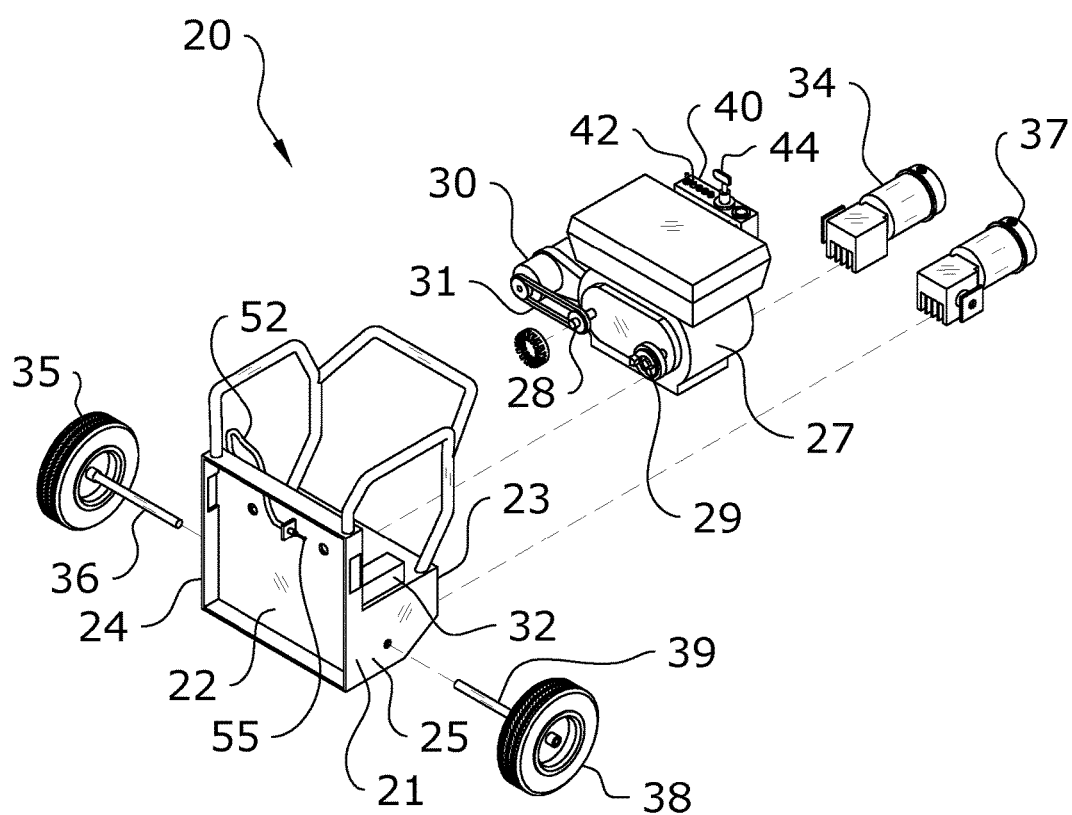
FIG. 3 is a frontal exploded view of a base in accordance with an example embodiment.

As best shown in FIGS. 2 and 3, the base 20 may include an alternator 30 which is connected to both the primary motor 27 and a battery 32. The alternator 30 is adapted to charge the battery 32, which in turn provides power to the drive motors 34, 37 for the wheels 35, 38. As shown in FIG. 3, the alternator 30 is connected to the primary motor 27 by a belt 31. More specifically, a belt 31 is connected between the alternator 30 and the primary drive unit 28 such that, when the primary drive unit 28 is rotated by the primary motor 27, the alternator 30 is similarly rotated.

In the figures, the alternator 30 is illustrated as extending outwardly from the first side 24 of the base 20. It should be appreciated that the alternator 30 may be positioned at various other locations on the base 20 so long as it is connected to the primary motor 27 in some fashion. Various types of alternators 30 may be utilized, and the exemplary configuration shown for illustrative purposes in the figures should not be construed as limiting on the scope of the present invention.

As best shown in FIG. 3, the base 20 includes a battery 32 which is charged by the alternator 30 when the primary motor 27 is running. The battery 32 is shown as being positioned near the second side 25 of the base 20, but it could be positioned at various other locations. Various types of batteries 32 may be utilized. For example, the capacity of the battery 32 may necessarily vary depending on power needs for operation. While the term "battery" is used in singular form throughout, it should be appreciated that multiple batteries 32 could be utilized in some embodiments. For example, a first battery 32 could be positioned near the first side 24 of the base 20 for powering the first drive motor 34 and a second battery 32 could be positioned near the second side 25 of the base 20 for powering the second drive motor 37.

Figure 4:
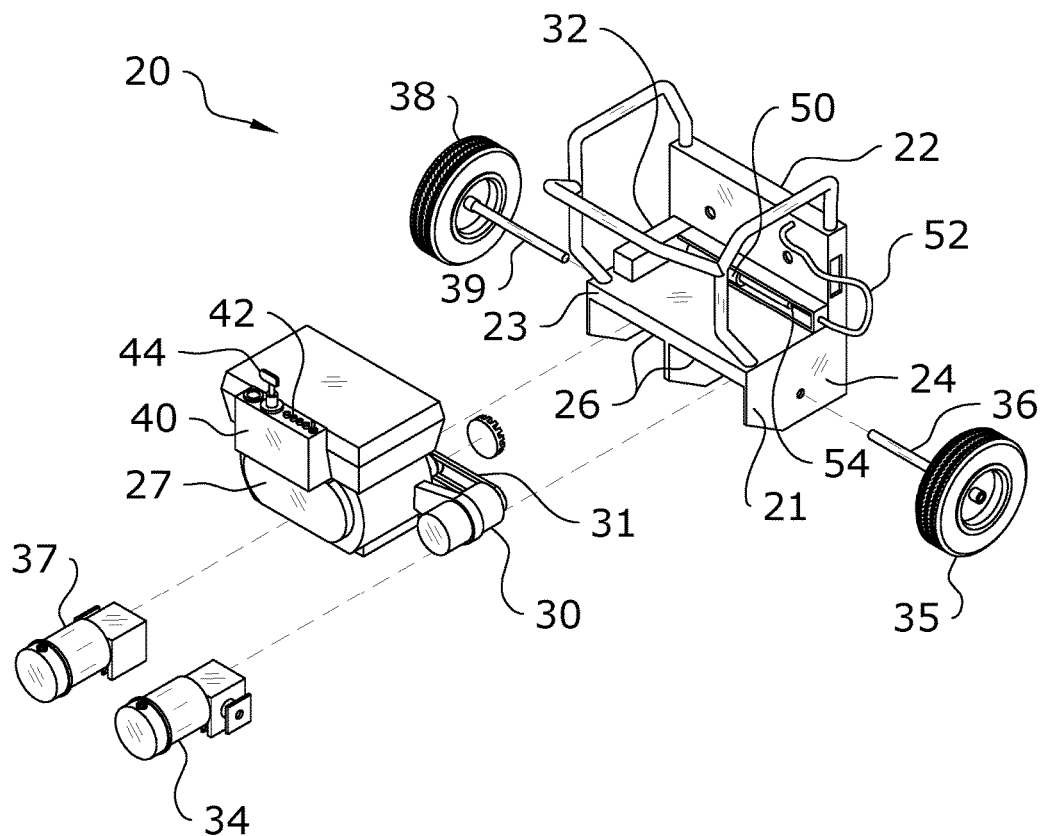
FIG. 4 is a rear exploded view of a base in accordance with an example embodiment.

As best shown in FIGS. 3 and 4, the base 20 generally includes a first wheel 35 near its first side 24 and a second wheel 38 near its second side 25. FIG. 3 illustrates that the first wheel 35 includes a first axle 36 which rotatably extends into the first side 24 of the base 20 and a second axle 39 which rotatably extends into the second side 25 of the base 20. In some embodiments, a single axle 36 could be utilized for both wheels 35, 38.

It should also be appreciated that more or less wheels 35, 38 could be utilized, and the wheels 35, 38 could be placed in different locations on the base 20, in different embodiments to suit different needs. For example, in some embodiments three wheels 35, 38 could be utilized; each with a corresponding drive motor 34, 37.

The wheels 35, 38 are driven by a pair of drive motors 34, 37. As shown in the figures, a first drive motor 34 is connected to and provides motion to the first wheel 35 and a second drive motor 37 is connected to and provides motion to the second wheel 38. In some embodiments, a single drive motor 34 may be provided to drive both wheels 35, 38. However, for improved maneuverability and control, it is preferable that each wheel 35, 38 include its own drive motor 34, 37. Such a configuration allows individual control of each wheel 35, 38 and can result in better control and tighter turns.

Various types of drive motors 34, 37 may be utilized. The figures illustrate electric drive motors 34, 37 which are powered by the battery 32. The battery 32 is preferably electrically connected to the drive motors 34, 37 to provide such power. It should be appreciated that, in some embodiments, different types of drive motors 34, 37 may be utilized. For example, a gas drive motor 34, 37 or a hydraulic gas motor 34, 37 could be utilized in different embodiments.

C. Control Unit

The figures illustrate a control unit 40 which is adapted to control operation of the drive motors 34, 37. The control unit 40 is illustrated as being stored in a housing positioned at the rear of the base 20, though it could be positioned in other locations. The control unit 40 will generally include a receiver 46 which is adapted to receive a signal from a corresponding transmitter 60 which is utilized to remotely control the present invention. Various types of receivers 46 may be utilized in combination with various types of signals.

The control unit 40 also includes a controller 47. The controller 47 may comprise integrated circuitry, electric circuitry, logic circuits, digital components, and/or analog components. The controller 47 is provided to translate signals received by the receiver 46 into instructions for operation of the drive motors 34, 37 and/or engagement actuator 50. For example, the controller 47, in response to a signal received by the receiver 46, may instruct the first drive motor 34 to move the first wheel 35 in a first direction while instructing the second drive motor 37 to move the second wheel 38 in a second direction to allow for a tight turn.

A control panel 42 is best shown in FIGS. 1 and 2 as being positioned at the rear of the base 20 near its rear end 23. The control panel 42 includes a plurality of controls 44 for operating the present invention. The control panel 42 may, for example, include controls for turning on/off the actuator 30, controlling the drive motors 34, 37, controlling the primary motor 27, and/or controlling the engagement actuator 50. The control panel 42 may also include various information to be displayed, such as a charge on the battery 32 or other types of warnings or alerts. The control panel 42 should not be construed as limited by the exemplary configuration of controls 44 shown in the figures.

Figure 5A:
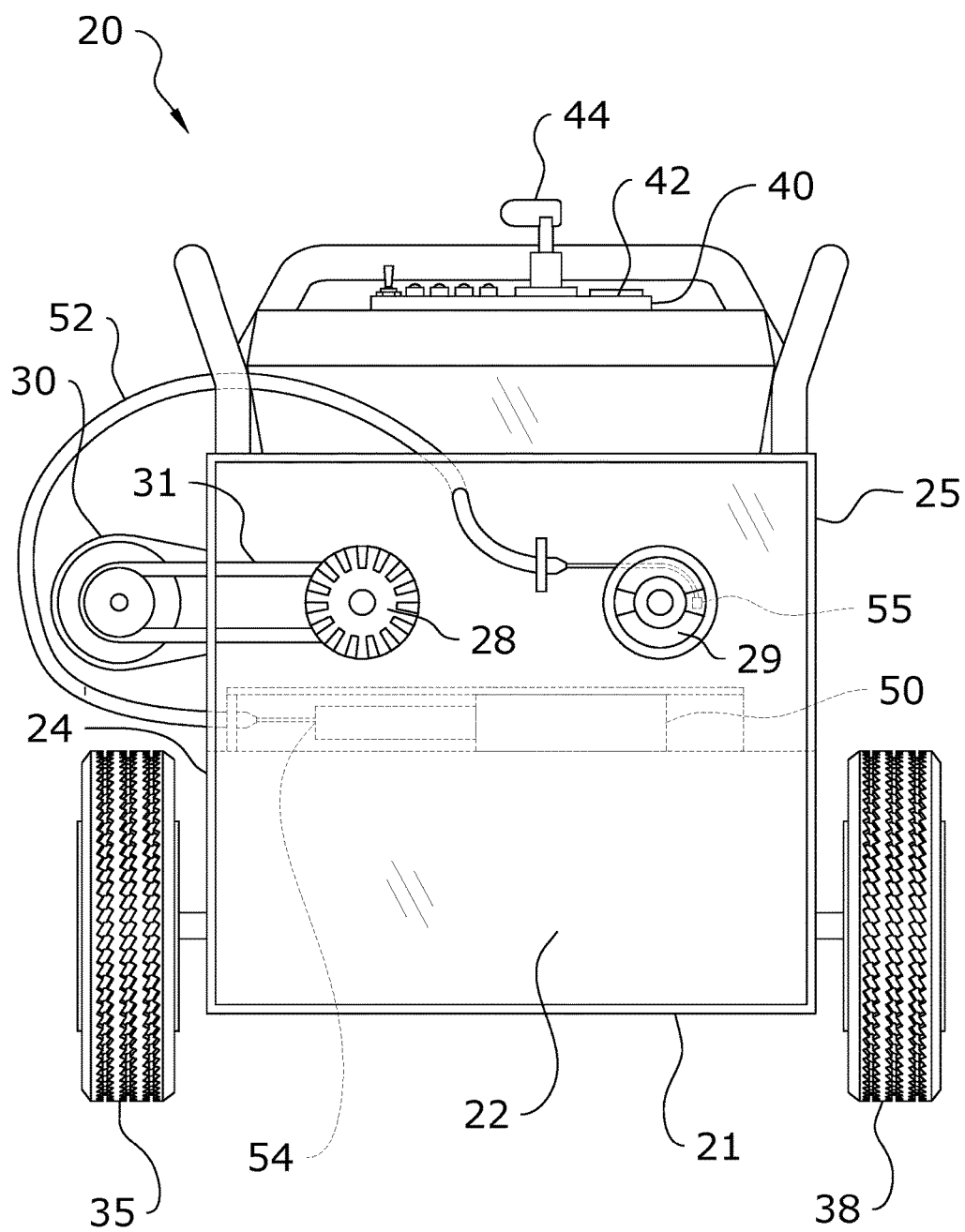
FIG. 5a is a frontal view of a base with the actuator in a first position in accordance with an example embodiment.
Figure 5B:
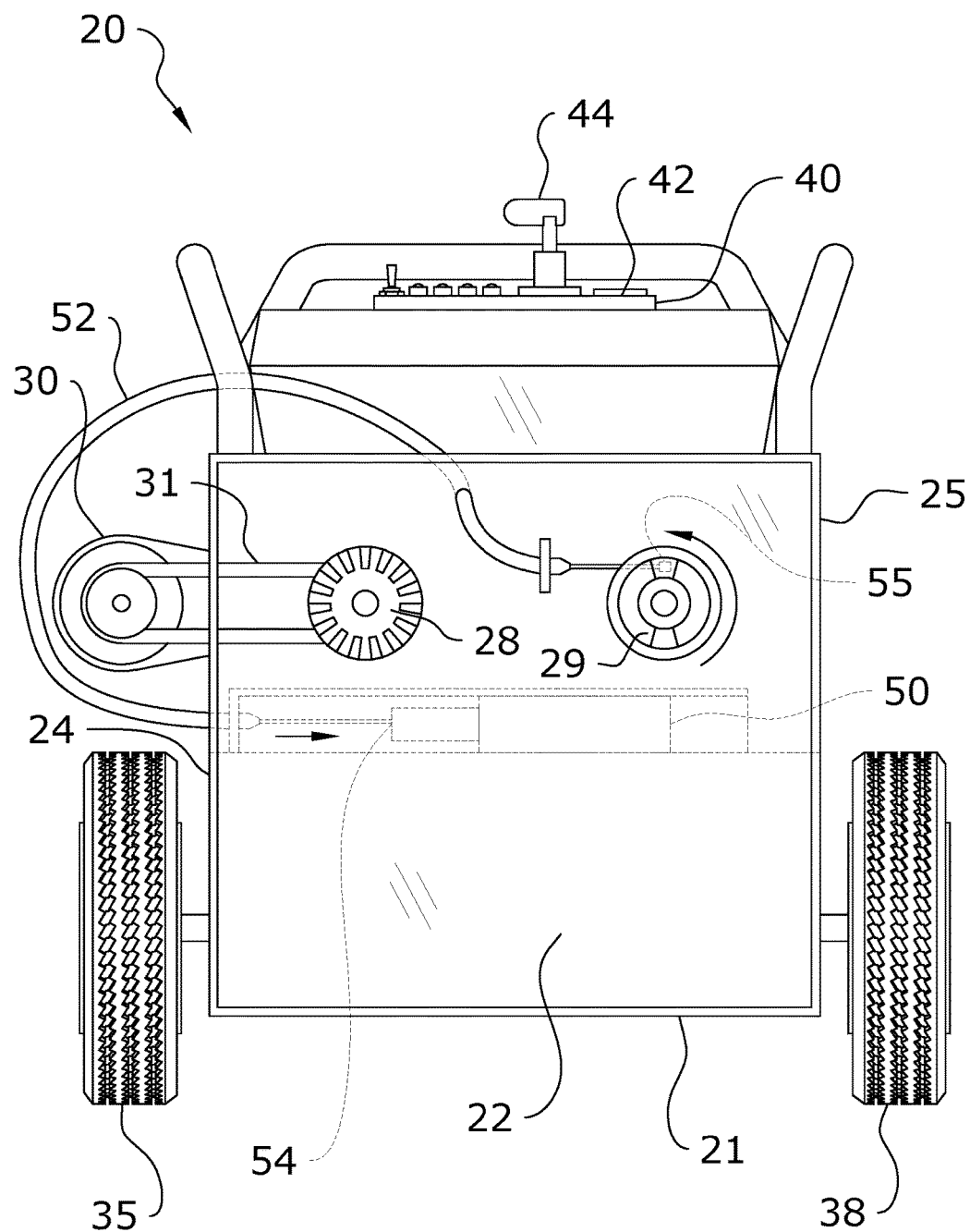
FIG. 5b is a frontal view of a base with the actuator in a second position in accordance with an example embodiment.
Figure 6:
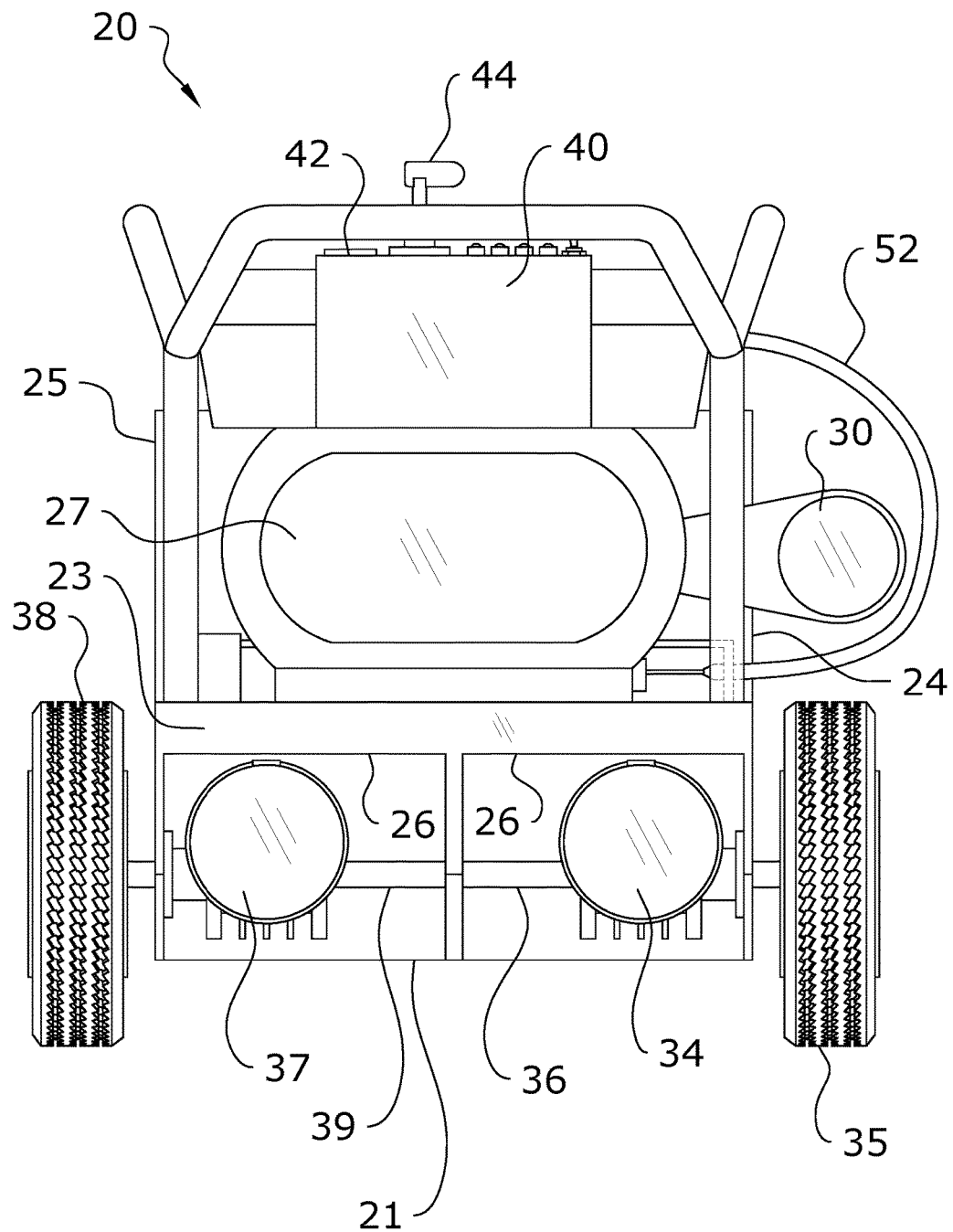
FIG. 6 is a rear view of a base in accordance with an example embodiment.
Figure 7:
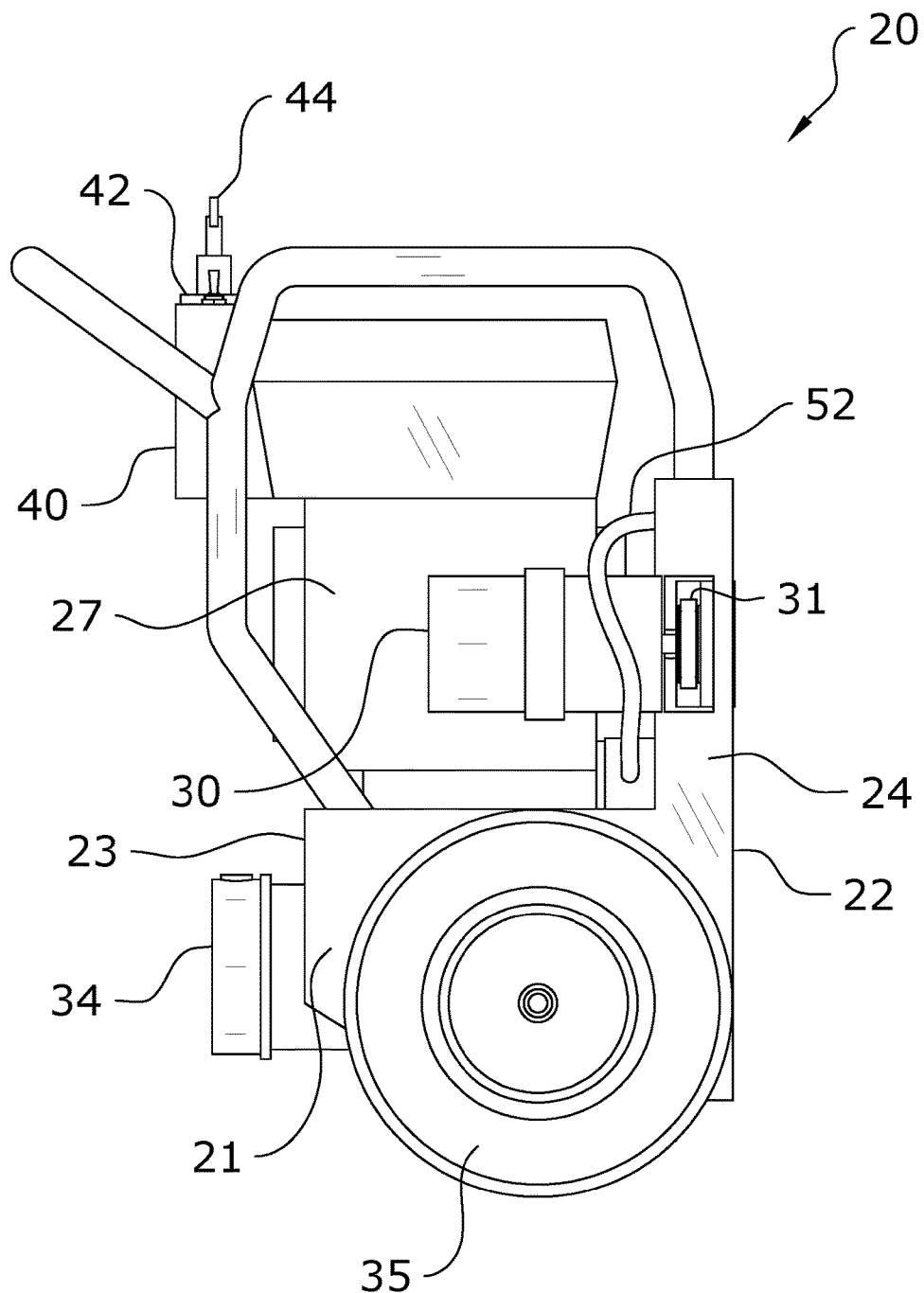
FIG. 7 is a first side view of a base in accordance with an example embodiment.
Figure 8:
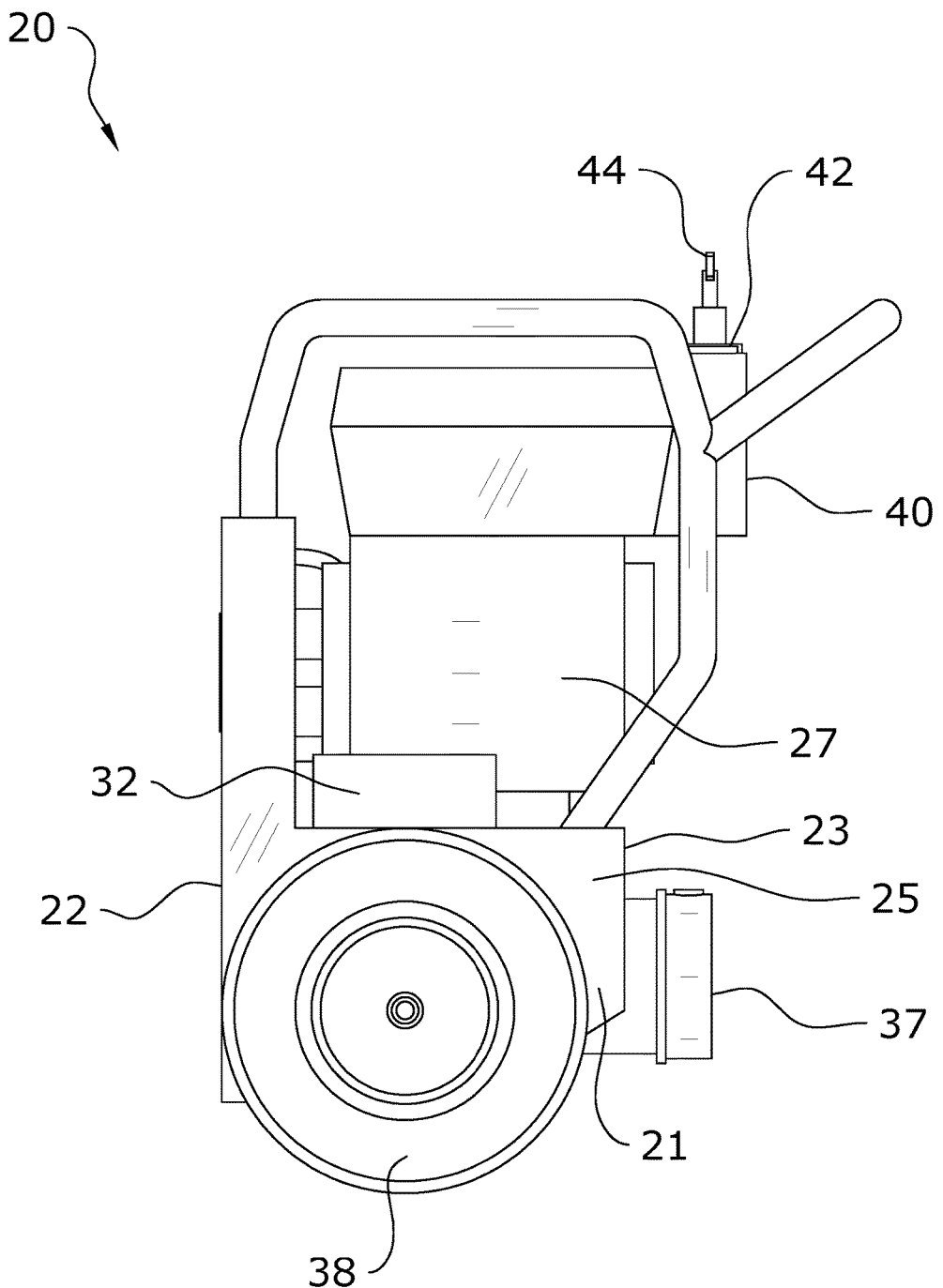
FIG. 8 is a second side view of a base in accordance with an example embodiment.
Figure 9:
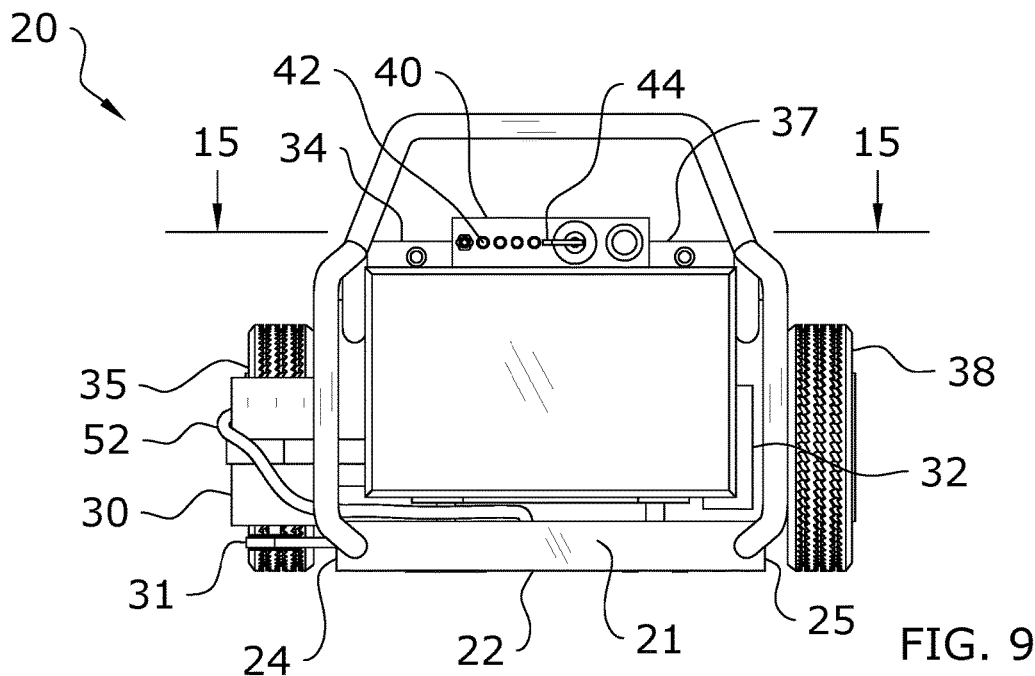
FIG. 9 is a top view of a base in accordance with an example embodiment.
Figure 10:
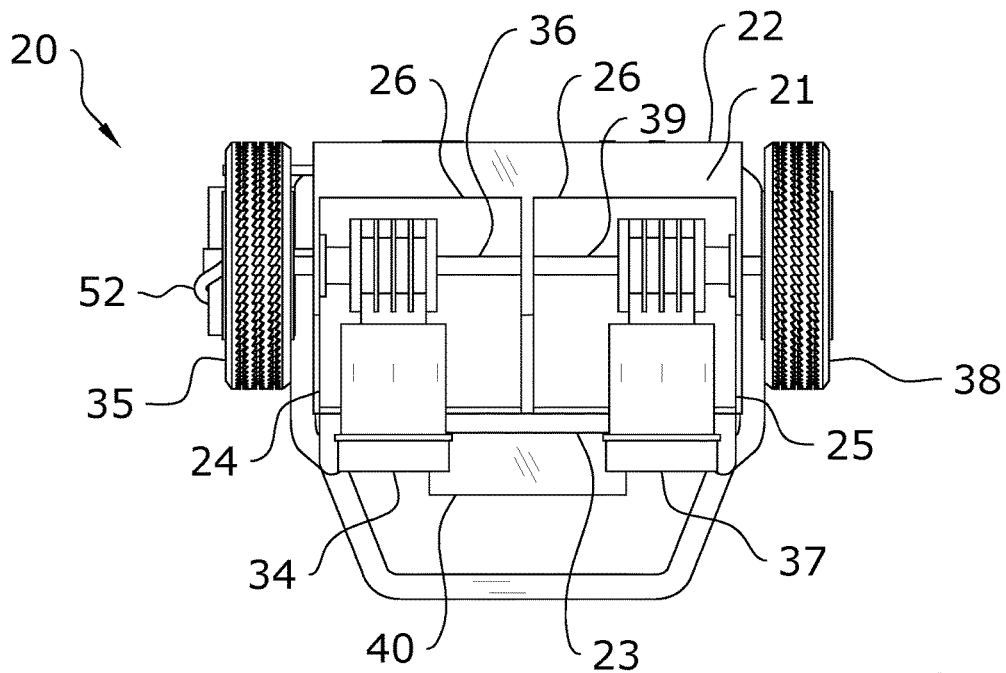
FIG. 10 is a bottom view of a base in accordance with an example embodiment.

In some embodiments, the base 20 may include a engagement actuator 50 which allows for starting and/or stopping of an attachment 70 while connected to the base 20. The engagement actuator 50 and its functionality is best shown in FIGS. 5a and 5b. As shown, the engagement actuator 50 is generally positioned near the rear end 23 of the base 20, though other locations may be utilized.

The figures illustrate the engagement actuator 50 as comprising a linear actuator. It should be appreciated that other types of actuators 50 may be utilized and the linear actuator shown is merely for exemplary purposes. The engagement actuator 50 includes a cable 52 having a first end 54 which is connected to the engagement actuator 50 and a second end 55 which is connected to the engagement adapter 29 of the base 20.

The cable 52, when actuated by the engagement actuator 50, may be utilized to rotate the engagement adapter 29 of the base 20 in one of two directions to engage or disengage rotation of the attachment 70 while connected to the base 20. The engagement actuator 50 is preferably connected to the receiver 46 such that the engagement actuator 50 may be remotely controlled by the transmitter 60. It should be appreciated that other means may be utilized for power transmission between engagement actuator 50 and engagement adapter 29. In this case, the cable is merely shown for exemplary purposes. Alternate means of power transmission include but are not limited to gears, hydraulic hose, pneumatic hose, vacuum hose, and solid linkage.

The transmitter 60 will generally comprise a handheld remote control or the like which sends a signal to the receiver 46 for operating various aspects of the present invention. By way of example, the transmitter 60 could be utilized to control the movement of the base 20 and attachment 70 by controlling the drive motors 34, 37. Additionally, the transmitter 60 could be utilized to control the on/off rotation of the attachment 70 by controlling the engagement actuator 50. Various other functionalities may be performed remotely by the transmitter 60, such as powering the primary motor 27 on or off in some embodiments.

Figure 14:
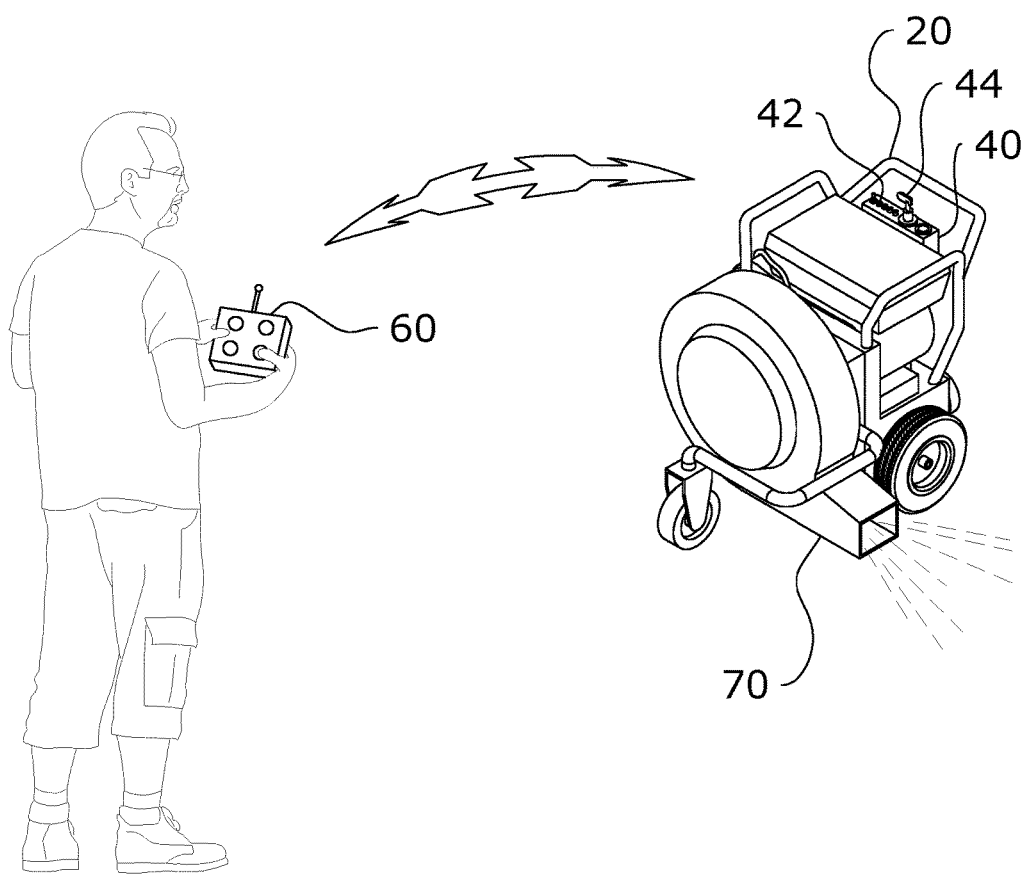
FIG. 14 is an upper perspective view of the present invention in use in accordance with an example embodiment.

Various types of transmitters 60 may be utilized. FIG. 14 illustrates a handheld remote control. However, in some embodiments, the transmitter 60 may comprise a smart phone or other handheld device so long as it is communicatively interconnected with the receiver 46 of the control unit 40. The transmitter 60 may include a video display which displays video from a camera (not shown) on the base 20 which allows for remote control of the base 20 and attachment 70 even without direct line of site on the unit.

D. Attachments

Figure 11:
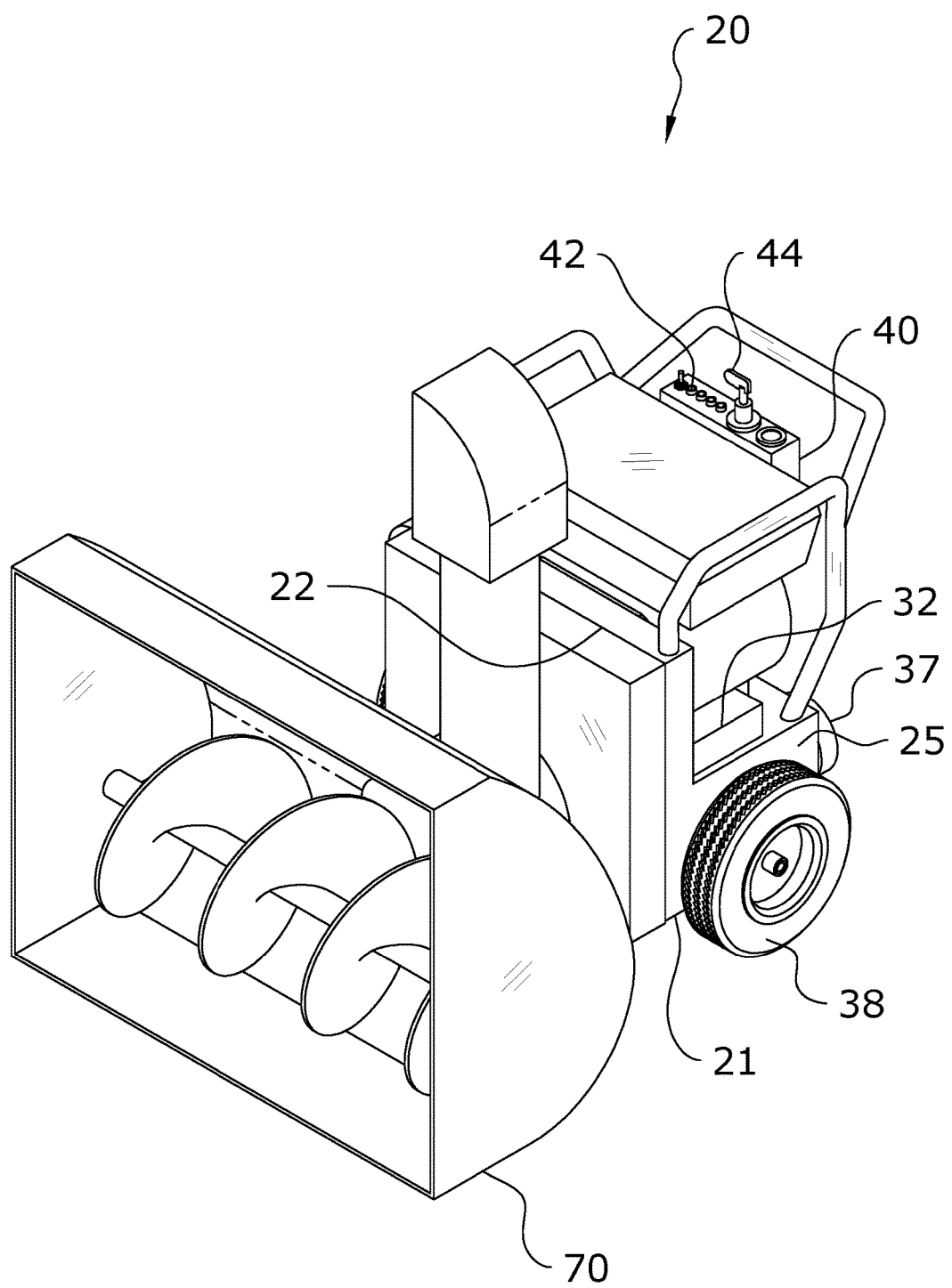
FIG. 11 is an upper perspective view of a base with a snow blower attachment connected in accordance with an example embodiment.
Figure 12:
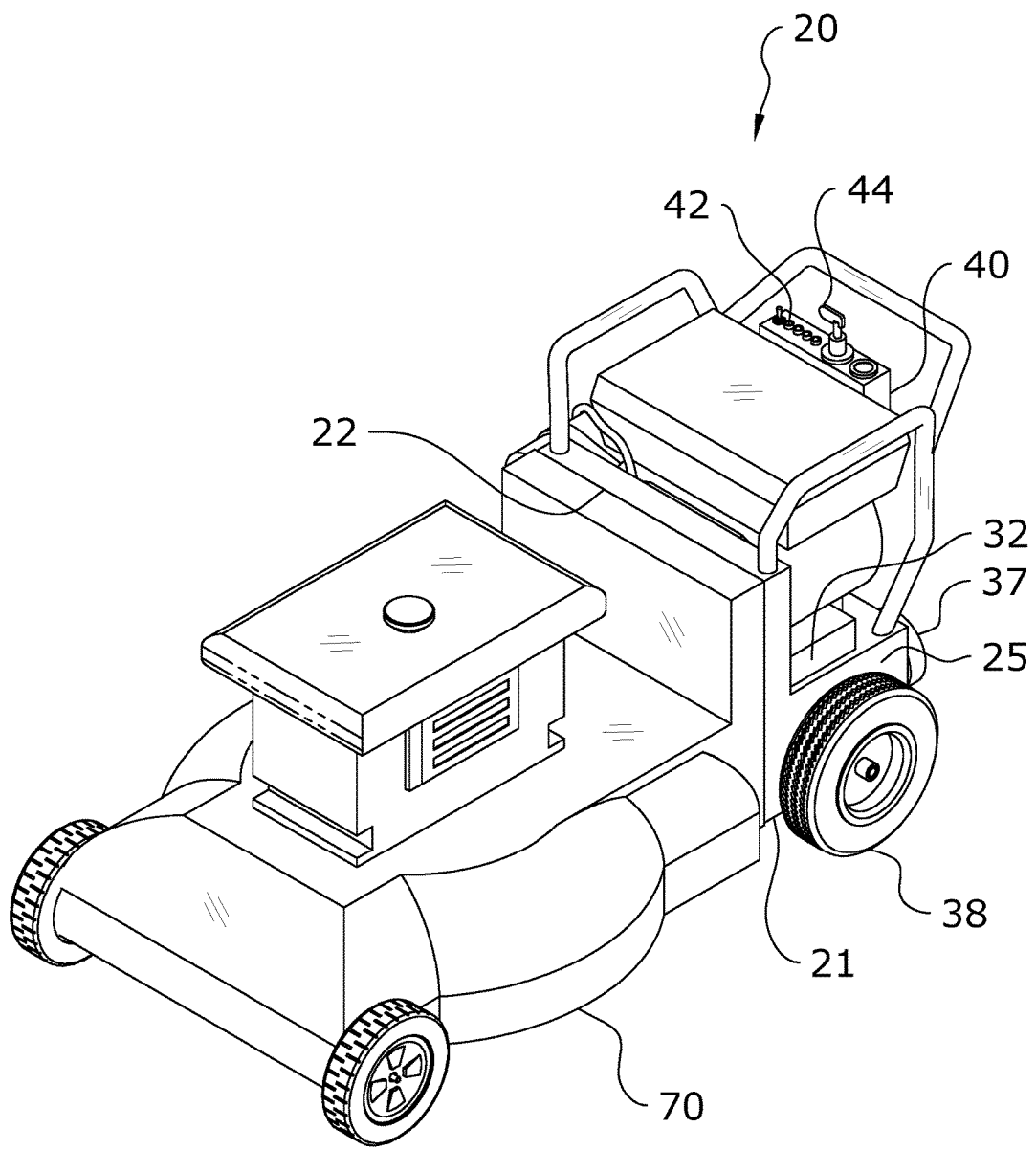
FIG. 12 is an upper perspective view of a base with a lawn mower attachment connected in accordance with an example embodiment.
Figure 13:
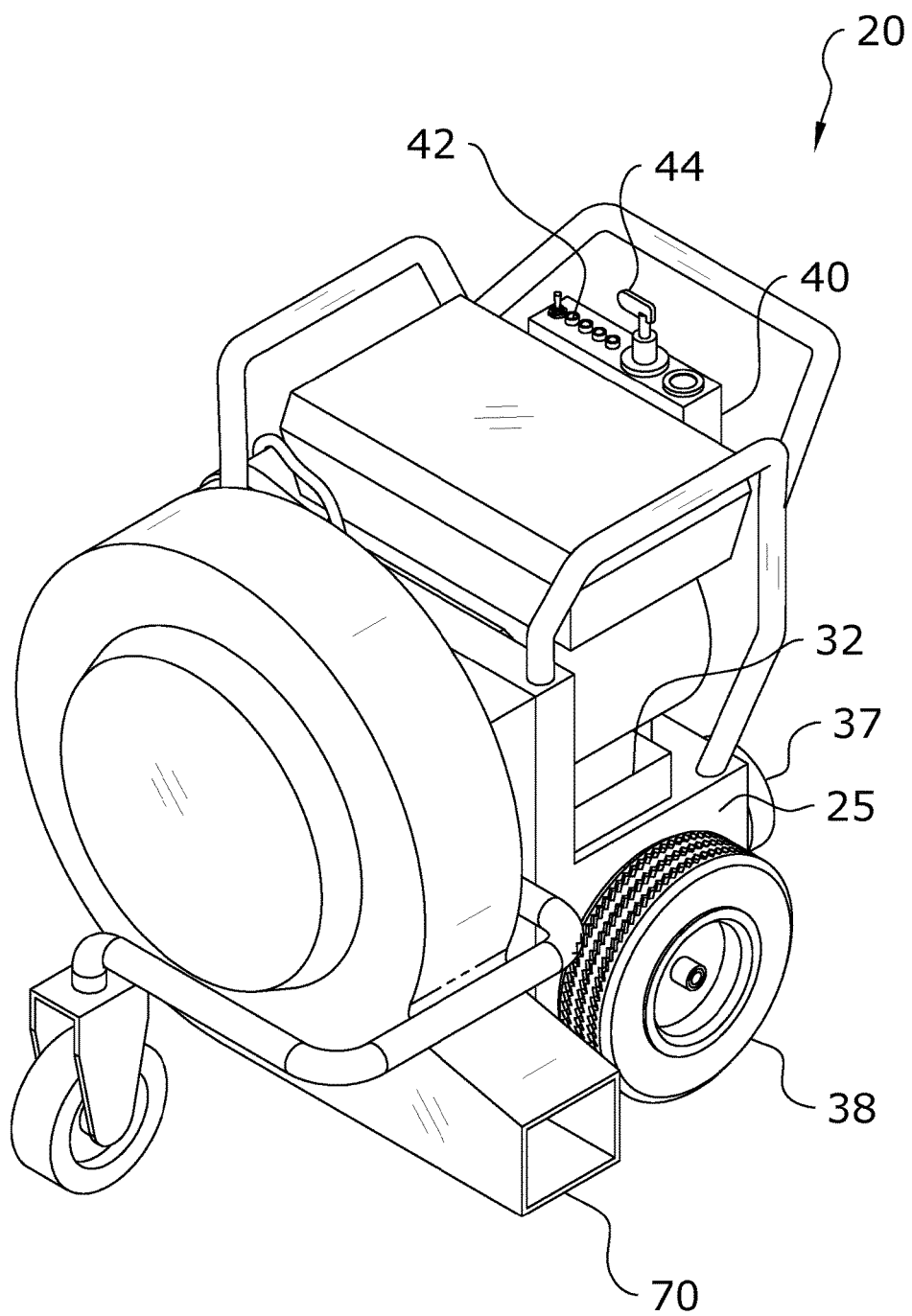
FIG. 13 is an upper perspective view of a base with a leaf blower attachment connected in accordance with an example embodiment.

A wide range of attachments 70 comprising different types of power equipment may be utilized to removably connect to the base 20 and be powered by the primary motor 27. FIG. 11 illustrates an exemplary attachment 70 comprised of a snow blower. FIG. 12 illustrates an exemplary attachment 70 comprised of a lawn mower. FIG. 13 illustrates an exemplary attachment 70 comprised of a leaf blower. These are merely for exemplary purposes and should not be considered limiting in any manner. Any type of attachment 70 which would benefit from being powered by the primary motor 27 may be utilized for any purpose.

E. Operation of Preferred Embodiment

In use, an attachment 70 is first connected to the base 20. The manner in which the attachment 70 and base 20 are connected together will vary widely and the present invention should not be construed as being limited in that regard. Any type of quick attach/detach system known in the art may be utilized to connect the attachment 70 and base 20. FIGS. 11-13 illustrate snow blower, lawn mower, and leaf blower attachments 70 connected to the base 20.

With the selected attachment 70 connected to the base 20, the remote system may be activated. The control panel 42 may be accessed, such as by using the controls 44, to activate the receiver 46 and controller 47 of the control unit 40. The transmitter 60 may be powered on or, in the case of the transmitter 60 comprising a smart phone, the smart phone may execute a software application to begin functioning as a transmitter for the present invention. In either case, the transmitter 60 should establish a communicative interconnection with the receiver 46 such that a signal from the transmitter 60 will be received by the receiver 46 and processed by the controller 47.

Figure 15:
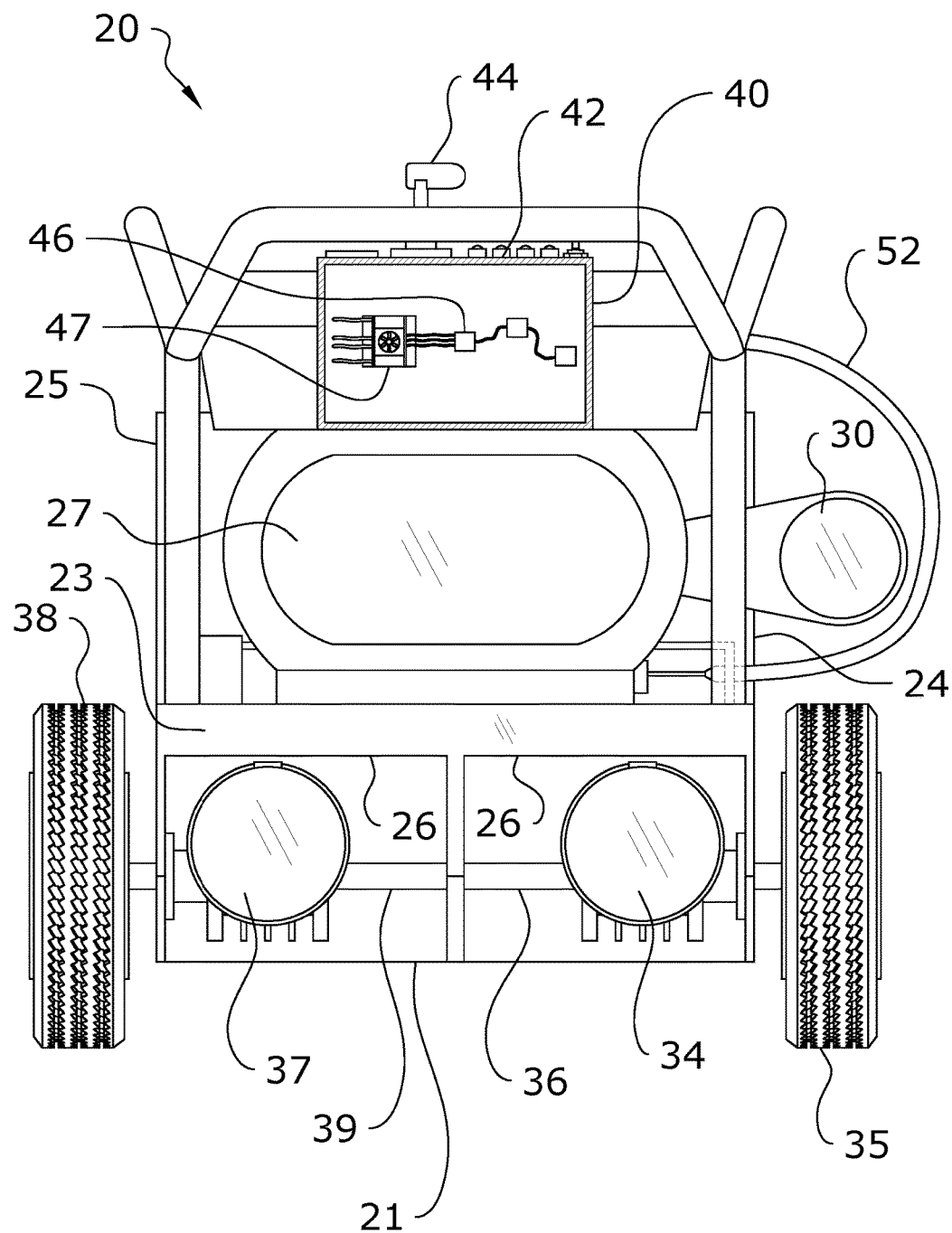
FIG. 15 is a rear sectional view illustrating the internal components of the control unit in accordance with an example embodiment.

FIG. 15 is an exemplary block diagram illustrating communicative interconnection between the transmitter 60 and receiver 46. The transmitter 60 may include controls such as buttons, levers, a touchscreen, or the like for controlling various aspects of the present invention. Once a connection has been established between the transmitter 60 and control unit 40 via the receiver 46, the base 20 may be powered on.

The base 20 may be turned on by manually starting the primary motor 27 by any manner known in the art for starting a motor, such as by pulling on a pull cord or using an electronic starter. In some embodiments, the base 20 may be turned on via the transmitter 60. In any case, the primary motor 27 is started such that the alternator 30 will turn via the belt 31 and charge the battery 32.

With the primary motor 27 running and the transmitter 60 communicating with the control unit 40, the operator may begin controlling the base 20 and attachment 70 with the transmitter 60. Manipulation of the transmitter 60, such as by pushing buttons or the like, is translated into a signal which is received by the receiver 46. The controller 47 processes this signal and, in response, controls the drive motors 34, 37 individually.

For example, if the operator desires to move the base 20 and attachment 70 forward, the transmitter 60 will be manipulated to enter the forward command (such as by pushing a throttle forward or the like). A signal will be communicated from the transmitter 60 to the receiver 46. The controller 47 will analyze the signal and, in response, activate both the first drive motor 34 and the second drive motor 37 at the same speed. The base 20 and attachment 70 will then move forward.

As another example, if a tight turn is desired, the controller 47 will instruct the first drive motor 34 to push the first wheel 35 forward and instruct the second drive motor 37 to push the second wheel 38 backward; resulting in a tight turn. If it is desired to reverse the base 20 and attachment 70, the first and second wheels 35, 38 will both be driven in reverse direction at the same speed by the drive motors 34, 37 in response to a command from the controller 47.

It should be appreciated that these are merely limited examples of the functionality. The drive motors 34, 37, and thus the wheels 35, 38, may be controlled in various manners by the controller 47 in response to instructions received from the transmitter 60 to perform various functions including moving forward, reversing, turning, and the like.

In some embodiments, the transmitter 60 may also be utilized to activate the engagement actuator 50. As shown in FIGS. 5a and 5b, activation of the engagement actuator 50 in a first direction is adapted to disengage the engagement adapter 29, such as a PTO adapter, that will disengage a clutch on attachment 70 such that the attachment 70 will cease to rotate, while base 20 continues to rotate. Activation of the engagement actuator 50 in a second direction is adapted to engage the engagement adapter 29 that will engage a clutch on attachment 70 such that the attachment 70 will rotate when the base 20 is rotating. The transmitter 60 may allow such functionality to be performed remotely by transmitting a signal to the control unit 40 to activate the engagement actuator 50 in a specific direction in response to operator inputs on the transmitter 60 itself.

Unless otherwise defined, all technical and scientific terms used herein have the same meaning as commonly understood by one of ordinary skill in the art to which this invention belongs. Although methods and materials similar to or equivalent to those described herein can be used in the practice or testing of the remotely controlled power equipment system, suitable methods and materials are described above. All publications, patent applications, patents, and other references mentioned herein are incorporated by reference in their entirety to the extent allowed by applicable law and regulations. The remotely controlled power equipment system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A remotely controlled power equipment system, comprising:
   a base including a primary motor, wherein the base includes at least one wheel;
   an attachment adapted to be removably connected to the base, wherein the attachment is adapted to be powered by the primary motor when the attachment is connected to the base;
   wherein the base comprises an engagement mechanism for starting and stopping the rotation of the attachment via a signal from the transmitter, wherein the base comprises an actuator, wherein the actuator is interconnected with the engagement mechanism such that adjustment of the actuator in a first direction engages the engagement mechanism and adjustment of the actuator in a second direction disengages the engagement mechanism, wherein the engagement mechanism comprises a power take off adapter;
   a cable connected between the actuator and the engagement mechanism;
   at least one drive motor for powering the at least one wheel;
   a transmitter; and
   a control unit including a receiver for receiving a signal from the transmitter, wherein the control unit is adapted to control the at least one wheel based on the signal received from the transmitter.

2. The remotely controlled power equipment system of claim 1, wherein the base includes a battery, wherein the battery is charged by the primary motor.

3. The remotely controlled power equipment system of claim 2, further comprising an alternator connected between the primary motor and the battery.

4. The remotely controlled power equipment system of claim 2, wherein the drive motor is comprised of an electric motor, wherein the drive motor is powered by the battery.

5. The remotely controlled power equipment system of claim 1, wherein the attachment comprises a lawn mower.

6. The remotely controlled power equipment system of claim 1, wherein the attachment comprises a leaf blower.

7. The remotely controlled power equipment system of claim 1, wherein the transmitter comprises a smart phone.

8. A remotely controlled power equipment system, comprising:
   a base including a primary motor, wherein the base includes a first wheel and a second wheel;
   wherein the base comprises a first wheel drive compartment and a second wheel drive compartment, wherein the first wheel drive is positioned within the first wheel drive compartment and the second wheel drive is positioned within the second wheel drive compartment;
   an attachment adapted to be removably connected to the base, wherein the attachment is adapted to be powered by the primary motor when the attachment is connected to the base;
   an engagement mechanism for controlling rotation of the attachment while connected to the base;
   a first drive motor for powering the first wheel;
   a second drive motor for powering the second wheel;
   a transmitter; and
   a control unit including a receiver for receiving a signal from the transmitter, wherein the control unit is adapted to control the first drive motor and the second drive motor based on the signal received from the transmitter.

9. The remote controlled power equipment system of claim 8, wherein the base includes a battery, wherein the battery is charged by the primary motor.

10. The remote controlled power equipment system of claim 9, further comprising an alternator connected between the battery and the primary motor.

11. The remote controlled power equipment system of claim 10, wherein the first drive motor and the second drive motor are each comprised of an electric motor.

12. The remote controlled power equipment system of claim 8, further comprising an actuator for engaging or disengaging rotation of the engagement mechanism.

13. The remote controlled power equipment system of claim 12, further comprising a cable connected between the actuator and the engagement mechanism.

14. The remote controlled power equipment system of claim 13, wherein the engagement mechanism comprises a power take off adapter.

15. A remotely controlled power equipment system, comprising:
- a base including a primary motor, wherein the base includes a first wheel and a second wheel;
- an attachment adapted to be removably connected to the base, wherein the attachment is adapted to be powered by the primary motor when the attachment is connected to the base;
- a power take off adapter for on/off control of the rotation of the attachment while connected to the base;
- an actuator connected to the power take off adapter by a cable, wherein adjustment of the actuator in a first direction engages the power take off adapter, wherein adjustment of the actuator in a second direction disengages the power take off adapter;
- a battery adapted to be charged by the primary motor;
- an alternator connected between the primary motor and the battery;
- a first drive motor for powering the first wheel, wherein the first drive motor is powered by the battery;
- a second drive motor for powering the second wheel, wherein the second drive motor is powered by the battery;
- a transmitter; and
- a control unit including a receiver for receiving a signal from the transmitter, wherein the control unit is adapted to control the first drive motor and the second drive motor based on the signal received from the transmitter, wherein the control unit is adapted to control the actuator based on the signal received from the transmitter.

16. A remotely controlled power equipment system, comprising:
- a base including a primary motor, wherein the base includes a first wheel and a second wheel;
- an attachment adapted to be removably connected to the base, wherein the attachment is adapted to be powered by the primary motor when the attachment is connected to the base;
- an engagement mechanism for controlling rotation of the attachment while connected to the base, wherein the engagement mechanism comprises a power take off adapter;
- an actuator for engaging or disengaging rotation of the engagement mechanism;
- a cable connected between the actuator and the engagement mechanism;
- a first drive motor for powering the first wheel;
- a second drive motor for powering the second wheel;
- a transmitter; and
- a control unit including a receiver for receiving a signal from the transmitter, wherein the control unit is adapted to control the first drive motor and the second drive motor based on the signal received from the transmitter.

* * * * *